United States Patent Office 3,431,343
Patented Mar. 4, 1969

3,431,343
DIMETHYL FLUORIDE - SUBSTITUTED METHYLENE BISPHENOL GERMICIDES AND FUNGICIDES
Herbert C. Stecker, 1 Bridle Way, Ho-Ho-Kus, N.J. 07423
No Drawing. Continuation-in-part of application Ser. No. 602,182, Dec. 16, 1966, which is a continuation-in-part of application Ser. No. 325,142, Nov. 20, 1963. This application Dec. 12, 1967, Ser. No. 689,805
U.S. Cl. 424—347     6 Claims
Int. Cl. A01n 9/30

ABSTRACT OF THE DISCLOSURE

A method of obtaining germicidal and fungicidal activity comprises the contacting of said micro-organisms with an effective concentration of at least one compound having the general formula:

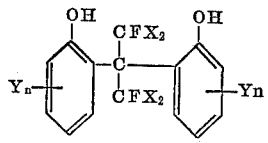

wherein:
X is a halogen atom of the class consisting of chlorine and fluorine,
Y is a member of the class consisting of hydrogen, methyl, bromine and chlorine, and
$n$ is a numeral from 0 to 3.

Cross references to related applications

This application is a continuation-in-part of copending application Ser. No. 602,182, filed on Dec. 16, 1966, now abandoned by Herbert C. Stecker, which application was a continuation-in-part of the then copending application Ser. No. 325,142, filed on Nov. 20, 1963, now abandoned by Herbert C. Stecker.

Background of the invention

This invention relates to methylene bisphenol compounds, wherein the methylene group has two methyl substituents, each of which contains at least one fluorine atom. One feature of the present invention is that the present compounds exert a potent germicidal effect even when both phenyl nuclei contain no halogen substitutions. This is in contrast to hexachlorophene type of bisphenols which, according to Gump and Walter (J. Soc. Cosmetic Chemists, 11, 307, 1960) require halogen substitution in the ring for effectiveness.

The Churchill Patent 2,698,866 discloses 1,1-bis-(2-hydroxy-3,5,6-trichloro-phenyl)-2,2,2-trichloroethane as a fungicide. In this case, the bridge carbon is a tertiary carbon, whereas, in the compounds of the present invention, a quaternary carbon bridge

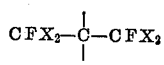

is present, together with at least one fluorine substituent on each of the methyl groups attached to the quaternary carbon, so that the present compounds are not isomers thereof, and they exert much more potent germicidal properties.

The Hennis and Thompson Patent 3,231,603 discloses as germicides, unsymmetrically halogenated derivatives of alkyli-denebis-phenols wherein the bridge is a divalent unhalogenated alkylidene radical, which are compounds not as effective as, and distinctly different from those of the present invention, in which the $=\!=\!C(FX_2)_2$ bridge exerts the major portion of the effectiveness of the compounds.

In the Noel and Casely Patent 3,081,266, a synergistic mixture of an unalkylated halogenated bisphenol and an alkylated halogenated bisphenol are shown to have germicidal effectiveness. However, the patent shows that, as far as the individual components of the binary mixture are concerned, they do not show even a mild germicidal effect, even in 2% concentration in toilet soap, whereas the individual compounds of the present invention exert a potent germicidal power under such conditions. Hence, the trichloroethane bridge cannot be considered the equivalent of a $=\!=\!C(FX_2)_2$ bridge.

Summary of the invention

The present invention involves a method of obtaining germicidal and fungicidal activity by contacting such micro-organisms with an effective concentration of at least one compound having the general formula:

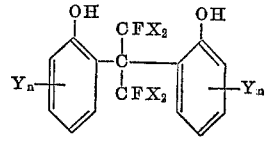

wherein:
X is a halogen atom of the class consisting of chlorine and fluorine,
Y is a member of the class consisting of hydrogen, methyl, bromine and chlorine, and
$n$ is a numeral from 0 to 3.

Examples of such compounds include
2,2'-trifluoromethyl-methylene-bisphenol,
2,2'-dichloromonofluoromethyl methylene-bisphenol,
2,2'-difluoromono-chloro-bis (4,6-dichlorophenol),
2,2'-trifluoromethyl-methylene-bis (3,4,6-trichlorophenol), and
2,2'-trifluoromethyl-methylene-bis (4,6-chloro-5-methyl phenol).

Description of the preferred embodiments

It has been found that superior biochemical, solubility, and stability characteristics can be obtained in 2,2'-methylene bisphenols by attaching, to the methylene groups, two halogen-substituted methyl groups having at least one fluorine atom apiece. Such methyl groups may be fluorodichloromethyl, difluorochloromethyl, or trifluoromethyl. Excellent germicidal properties are obtained with such compounds, as is apparent from the data given in Table I. The marked effectiveness of the germicidal properties of the compounds of the present invention may be readily perceived. For example, Compound 9 of the table has an effectiveness of 15.0 mm. against *Staph. aureus*, whereas the corresponding tetrabromo bisphenol containing a non-halogenated bridge shows a zone of inhibition of only 2.0 mm. The compounds also have fungicidal, anthelmintic, and other valuable properties.

The preparation of the compounds of the present invention may be determined from the following example:

Preparation of 2,2'-trifluoromethyl-methylene-bisphenol

One mole of trifluoroacetone is added to a mixture of 0.09 mole of phenol and 0.15 mole of anhydrous hydrogen fluoride, while being cooled with dry ice. The reactants then are sealed in a copper ampoule and heated on a steam bath for 10 hours, after which the contents are poured into a copper vessel. The unreacted phenol is steam-distilled after the evaporation of the hydrogen fluoride, and the residue is recrystallized from ethylene chloride.

The yield of 2,2'-trifluoromethyl-methylene-bisphenol is 95% of theory.

Since the halogenated acetone forms the methylene bridge, the type of methyl substituents may be determined by selecting the proper halogens on the acetone. Also, the phenol may be substituted with the desired substituents prior to the condensation, although halogenation of the condensation product also is possible.

Table I identifies some of the various compounds used in the invention, and shows their germicidal effectiveness when tested against *Staphylococcus aureus* in soap solutions. The effectiveness of the compounds as to microbiological activity was determined as follows:

A 24-hour old culture of *S. aureus* was used to seed sterile agar plates. The compound was mixed with "Ivory" brand soap (a neutral white high grade toilet soap consisting of a mixture of about 80% sodium soap and about 20% potassium soap produced from a 70% tallow and 30% coconut oil glyceride blend, in accordance with Patent No. 2,295,594), in a 1% concentration by weight of the soap containing 0.1% by weight of the germicidal compound. Cotton discs of 10 mm. diameter were steeped in this aqueous mixture, rinsed, dried, and placed on seeded agar. After incubating for 24 hours at 37° C., zones of inhibition were determined and recorded, as specified in the table.

The compounds of the present invention also have been found to be germicidally active against other bacteria, fungi, and similar organisms, such as *A. niger, E. coli, S. typhi,* and *L. casei*.

Table II lists additional individual compounds disclosed in both Patents 2,698,866 and 3,081,266, and germicidal results obtained by the method already disclosed for Table I, are also listed with respect to *S. aureus*. It will be noted that the reference compounds are ineffective, whereas the compounds of the present invention are very potent germicides.

Table III shows germicidal results of the aforesaid compounds, as well as compounds disclosed in Patent No. 3,081,266, using the test method described for Example II in Patent No. 3,081,266. The results are reported in the same way as for Example II in Patent No. 3,081,266, 2% by weight of the "active ingredient" being added to the "Ivory" neutral white toilet soap. It will also be noted here that only the compounds of the present invention showed no growth of *M. pyogenes* var. *aureus*, whereas the compounds of the reference patents showed normal heavy growth (over 1000 colonies present).

These compounds have been found to be excellent mildew-proofing and germicidal agents for fibrous materials such as cloth, leather, paper, wood, and the like. Treatment of fibrous material may be made with a solution or dispersion of the germicide in a liquid medium, leaving about 0.001% to 0.05%, or even 0.5%, or as much as 5.0% by weight of the germicide in the fibrous material.

The germicides of the present invention also may be incorporated in plastics, such as rubber, polyethylene, polystyrene, polyurethane, nylon, and similar plastoform and elastoform compositions by incorporating the germicide in an amount of 0.001% to 0.05% or even 0.1% or as much as 0.5% and 5.0% in the batch which is mixed or kneaded prior to vulcanization, extrusion or other forming operation.

The compounds of the present invention are particularly valuable in detergent and toilet detergent compositions, in the amount of 0.001% to 0.01% by weight, and to about 0.5% or even 1.0%, 2%, 5% or even 10%. They may be admixed in commercial toilet soaps, such as neutral high grade sodium and potassium salts of fatty acids from tallow, olive oil, palm oil, and the like, above or with non-soap synthetic detergents, e.g., non-ionic, anionic, or cationic.

The term "detergent" employed herein includes fatty acid soaps, as well as synthetic detergents, and other detergents, such as fatty alcohol sulfates, fatty acid amides, sodium tripolyphosphates, and combinations thereof. The term "toilet soap" used herein also is employed in its popular meaning, that is, those compositions employed for cleansing the skin and prepared from an alkali metal compound, such as potassium or sodium hydroxide and fat or fatty acid, both saturated and unsaturated. The compositions described herein also include other antiseptic agents, emollients, water softeners, antioxidants, dyes, perfume, "cold cream" additives, and the like.

TABLE I

| Compound Number | Formula | Zone of Inhibition, mm. |
|---|---|---|
| 1 | OH, CF$_3$, O, CF$_3$ bisphenol | 8.0 |
| 2 | OH, CF$_2$Cl, C, CF$_2$Cl bisphenol | 10.0 |
| 3 | OH, CF$_2$Cl, C, CFCl$_2$ bisphenol | 10.0 |
| 4 | OH, CFCl$_2$, C, CFCl$_2$ bisphenol | 10.0 |
| 5 | OH, CF$_3$, C, CF$_3$ bisphenol, Cl | 9.0 |
| 6 | Cl, OH, CF$_3$, C, CF$_3$, OH, Cl bisphenol | 10.0 |
| 7 | Cl, OH, CF$_3$, C, CF$_3$, OH, Cl bisphenol, Cl, Cl | 14.0 |

TABLE I.—Continued

| Compound Number | Formula | Zone of Inhibition, mm. |
|---|---|---|
| 8 | [2,2'-bis(hydroxyphenyl) structure with CF$_3$/CF$_3$ bridge, Cl substituents] | 14.0 |
| 9 | [bis(hydroxyphenyl) structure with CF$_3$/CF$_3$ bridge, Br substituents] | 15.0 |
| 10 | [bis(hydroxyphenyl) structure with CF$_3$/CF$_3$ bridge, Cl and CH$_3$ substituents] | 11.0 |

TABLE II

| Chemical Composition | Method (see page 4 of CIP) S. aureus Zones of Inhibition (mm.) |
|---|---|
| [bis(hydroxyphenyl) CHCCl$_3$ bridge, Cl substituents] | 0.0 |
| [bis(hydroxyphenyl) CHCCl$_3$ bridge, Cl substituents] | 0.0 |
| [bis(hydroxyphenyl) C(CFCl$_2$)$_2$ bridge] | 10.0 |
| [bis(hydroxyphenyl) C(CF$_3$)$_2$ bridge] | 8.0 |
| [bis(hydroxyphenyl) C(CF$_2$Cl)(CFCl$_2$) bridge] | 10.0 |
| [bis(hydroxyphenyl) C(CF$_3$)$_2$ bridge, Cl substituents] | 14.0 |

TABLE III

| Composition | Percent Composition |
|---|---|
| | A B C D E F G H I |
| "Ivory" White Toilet Soap | 98 98 98 98 98 98 98 98 98 |
| [bis(hydroxyphenyl)methane, Cl substituted] | 2 |
| [bis(hydroxyphenyl) sulfide, CH$_3$ and Cl substituted] |     2 |
| [bis(hydroxyphenyl) CHCCl$_3$, CH$_3$ and Cl substituted] |         2 |
| [bis(hydroxyphenyl) CHCCl$_3$, Cl substituted] |             2 |
| [bis(hydroxyphenyl) CHCCl$_3$, Cl substituted] |                 2 |
| [bis(hydroxyphenyl) C(CFCl$_2$)$_2$] |                     2 |
| [bis(hydroxyphenyl) C(CF$_3$)$_2$] |                        2 |
| [bis(hydroxyphenyl) C(CFCl$_2$)(CF$_2$Cl)] |                           2 |
| [bis(hydroxyphenyl) C(CF$_3$)$_2$, Cl substituted] |                             2 |

| Composition | A | B | C | D | E | F | G | H | I |
|---|---|---|---|---|---|---|---|---|---|
| Period of Inoculation (Hours) | 48 | 48 | 48 | 48 | 48 | 48 | 48 | 48 | 48 |
| Amount of Growth | 3+ | 3+ | 3+ | 3+ | 3+ | | | | |

I claim:
1. A method of controlling bacteria and fungi comprising contacting said micro-organisms with an effective amount of the compound having the formula:

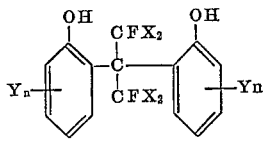

wherein:
X is a halogen atom of the class consisting of chlorine and fluorine,
Y is a member of the class consisting of hydrogen, methyl, bromine and chlorine, and
$n$ is a numeral from 0 to 3.

2. A method, according to claim 1, in which the compound is:

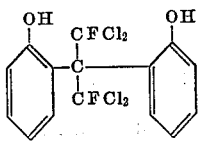

3. A method, according to claim 1, in which the compound is:

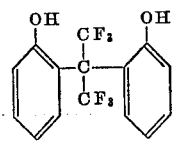

4. A method according to claim 1, in which the compound is:

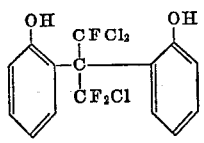

5. A method according to claim 1 in which the compound is:

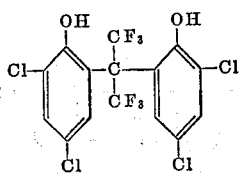

6. A method according to claim 1 in which the compound is:

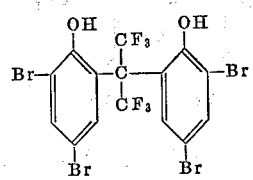

References Cited

UNITED STATES PATENTS

| | | | |
|---|---|---|---|
| 2,698,866 | 1/1955 | Churchill | 167—31 |
| 3,081,266 | 3/1963 | Noel | 167—31 |
| 3,231,603 | 1/1966 | Hennis | 167—31 |

OTHER REFERENCES

Gump et al., J. Soc. Cosmetic Chemists 11: 307–314 (1960).

ALBERT T. MEYERS, *Primary Examiner.*

JEROME D. GOLDBERG, *Assistant Examiner.*

U.S. Cl. X.R.

252—106, 107